United States Patent [19]
Mori et al.

[11] Patent Number: 5,323,449
[45] Date of Patent: Jun. 21, 1994

[54] APPARATUS FOR COMMUNICATION BY TELEPHONE SET AND FACSIMILE SET THROUGH ORDER WIRES

[75] Inventors: Masahiko Mori; Tadaharu Kato, both of Tokyo, Japan

[73] Assignee: NEC Corporation, Japan

[21] Appl. No.: 749,208

[22] Filed: Aug. 23, 1991

[30] Foreign Application Priority Data

Aug. 23, 1990 [JP] Japan .................. 2-220064

[51] Int. Cl.$^5$ .......................................... H04M 11/00
[52] U.S. Cl. ...................................... 379/100; 379/402
[58] Field of Search ................ 379/100, 94, 96, 97, 379/98, 93, 345, 402

[56] References Cited

U.S. PATENT DOCUMENTS 5,003,581  3/1991  Pittard ...................................... 379/93
5,121,423  6/1992  Morihiro et al. ..................... 379/100

Primary Examiner—Curtis Kuntz
Assistant Examiner—Stella L. Woo
Attorney, Agent, or Firm—Ostrolenk, Faber, Gerb & Soffen

[57] ABSTRACT

Apparatus for use in receiving input signals through order wires; at least one of the input signals is a specific signal including an input control signal indicative of supply of the specific signal to either a telephone set (6) or a facsimile set (15). A processing circuit processes (2) the input signals into an input single signal; an input detecting circuit (3) detects the input control signal in the input single signal; a judging circuit (14) judges whether the input control signal indicates supply of the input single signal to the telephone set, or to the facsimile set and produces an input connection signal; and a connection unit (20) connects the processing circuit to the telephone set and to the facsimile set when the input connection signal indicates the telephone set and the facsimile set, respectively. It is also possible to use the apparatus to transmit output signals produced by the telephone set and the facsimile set through the order wires.

4 Claims, 1 Drawing Sheet

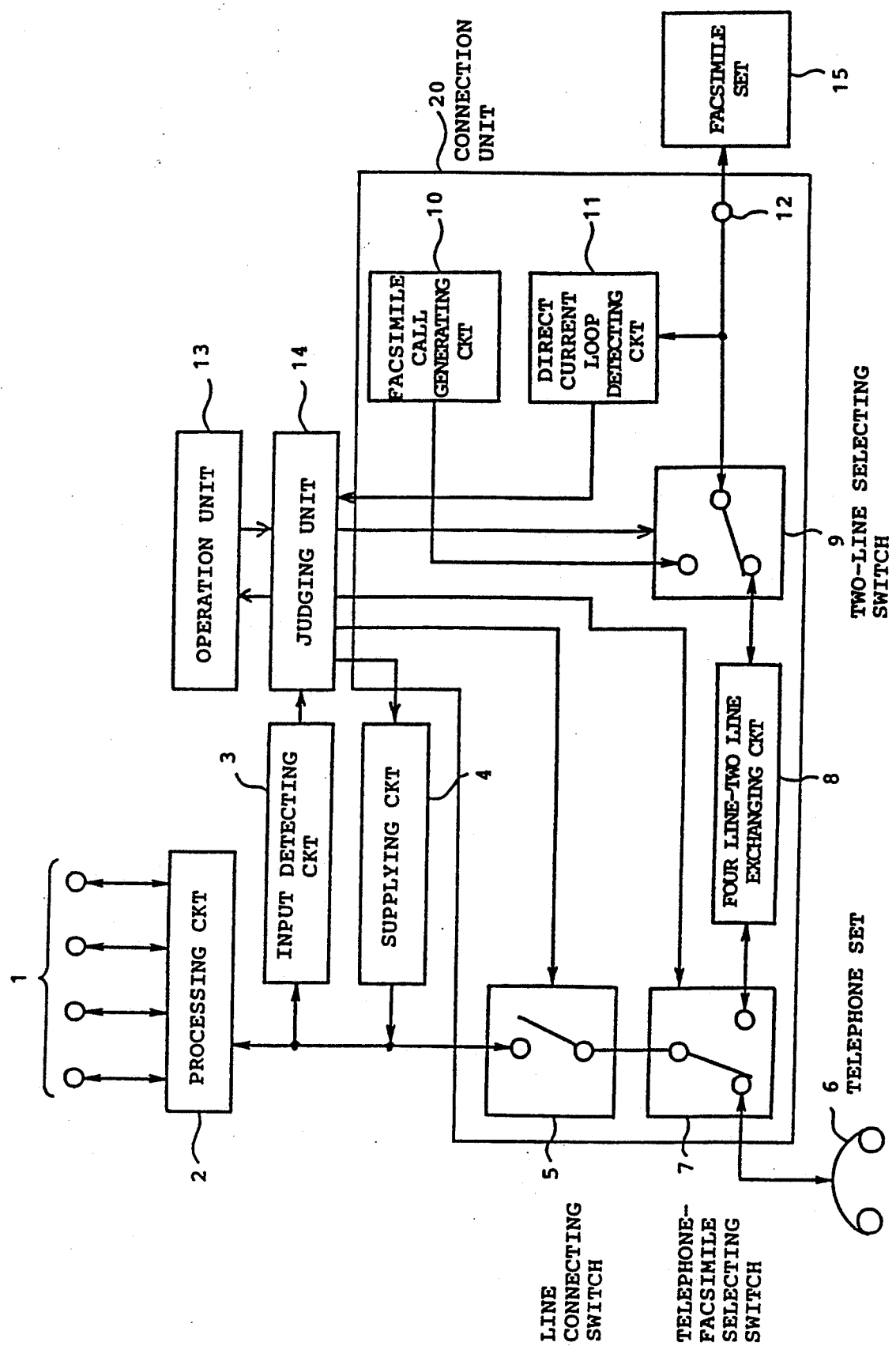

APPARATUS FOR COMMUNICATION BY TELEPHONE SET AND FACSIMILE SET THROUGH ORDER WIRES

BACKGROUND OF THE INVENTION

This invention relates to apparatus using order wires for communication between a local station and a counterpart station by a telephone set and a facsimile set. In other words, order wires are used in this invention rather than public wires.

In general, order wires are of a four-wire type. The apparatus of the type described in this application is used for receiving and transmitting through the order wires four-line input signals and four-line output signals, respectively. At least one of the input signals is a specific signal including a called number signal indicative of supply of the specific signal to the local station. Similarly, at least one of the output signals is a specific signal including a calling number signal indicative of transmission of the specific signal to the counterpart station.

In the prior art, such apparatus comprises a processing circuit connected to the order wires for processing the input signals into an input single signal including the called number signal, and for processing an output single signal into the output signals including the calling number signal. The output single signal is produced by a telephone set in the local station.

An input detecting circuit is connected to the processing circuit and detects the input control signal in the input single signal as a detected signal.

An input judging circuit is connected to the input detecting circuit and judges whether the detected signal indicates supply of the input single signal to the local station or not. The input judging circuit produces an input connection signal indicative of the local station after having judged that the detected signal indicates supply of the input single signal to the local station.

An output producing circuit produces an indicating signal indicative of production of the output single signal by the local station.

An output judging circuit is connected to the output producing circuit and produces an output connection signal indicative of the counterpart station.

A supplying circuit is connected to the output judging circuit and supplies the output single signal with the calling number signal indicative of supply of the output single signal to the counterpart station in response to the output connection signal.

A connecting unit is connected to the input judging circuit and connects the processing circuit to the telephone set in the local station when the input connection signal indicates the local station. The connecting unit is connected to the output judging circuit and connects the processing circuit to the telephone set in the local station in response to the output connection signal.

It has now been found by the present inventor that the aforementioned apparatus of the prior art enables communication between stations by a telephone set through the order wires even if there are no public wires between the stations.

However, when the apparatus is used for communicating between the local and the counterpart stations by a facsimile set, it is necessary to use the public wires. As a result, the apparatus cannot communicate between stations by the facsimile set without the public wires.

SUMMARY OF THE INVENTION

It is therefore an object of this invention to provide apparatus capable of communicating between local and counterpart stations a facsimile set by using order wires.

This invention is applicable to an apparatus for used for receiving through order wires a plurality of input signals, at least one of the input signals being a specific signal including an input control signal indicative of supply of the specific signal to an indicated one of a telephone set and a facsimile set. According to this invention, the apparatus comprises: (A) an input processing circuit connected to the order wires for processing the input signals into an input single signal including the input control signal; (B) an input detecting circuit connected to the input processing circuit for detecting the input control signal in the input single signal as a detected signal; (C) an input judging circuit connected to the input detecting circuit for judging whether the detected signal indicates supply of the input single signal to the telephone set or to the facsimile set, the input judging circuit producing an input connection signal indicative of the telephone set and the facsimile set after having judged that the detected signal indicates supply of the input single signal to the telephone set and to the facsimile set, respectively; and (D) input connecting means connected to the input judging circuit for connecting the input processing circuit to the telephone set and to the facsimile set when the input connection signal indicates the telephone set and the facsimile set, respectively.

BRIEF DESCRIPTION OF THE DRAWING

The sole FIGURE is a block diagram of an apparatus according to an embodiment of the present invention.

DESCRIPTION OF THE PREFERRED EMBODIMENTS

Referring to the sole FIGURE, an apparatus in accordance with the present invention is shown for receiving and transmitting, through order wires 1, four-line input signals and four-line output signals. At least one of the input signals is a specific signal including a called number signal and an input control signal. The called number signal indicates supply of the specific signal to a local station. The input control signal indicates supply of the specific signal to an indicated one of a telephone set 6 and a facsimile set 15.

At least one of the output signals is a specific signal including a calling number signal and an output control signal. The calling number signal indicates supply of the specific signal to a counterpart station. The output control signal indicates production of an output single signal by an indicated one of the telephone set 6 and the facsimile set 15.

The description will now proceed to a case where the apparatus receives the four-line input signals by one of the telephone set 6 and the facsimile set 15.

The apparatus comprises a processing circuit 2 connected to the order wires 1 to process the four-line input signals into an input single signal including the called number signal and the input control signal.

An input detecting circuit 3 is connected to the processing circuit 2 and detects the called number signal and the input control signal in the input single signal as a detected signal. A judging unit 14 is connected to the input detecting circuit 3 to serve as an input judging circuit. The input judging circuit judges whether the called number signal indicates supply of the input single signal to the local station or not, and whether the input control signal indicates supply of the input single signal to the telephone set 6 or to the facsimile set 15. The input judging circuit produces an input connection signal indicative of the local station and indicative of the telephone set 6 or the facsimile set 15 after having judged that the detected signal indicates supply of the input single signal to the telephone set 6 or the facsimile set 15, respectively.

When the input control signal indicates supply of the input single signal to the telephone set 6 in the local station, the input judging circuit produces a ringing signal. An operation unit 13 is connected to the judging unit 14 and serves as an input ringing circuit when supplied with the ringing signal. Responsive to the ringing signal, the input ringing circuit rings for an attendant to the local station. The input ringing circuit produces a response signal when the telephone set 6 is put in an off-hook state by the attendant. The input judging circuit detects the response signal and makes the input ringing circuit stop production of the ringing, and supplies the input connection signal to a connection unit 20.

The connection unit 20 is connected to the judging unit 14 and comprises a line connecting switch 5 and a telephone-facsimile selecting switch 7 connected in tandem to each other. The line connecting switch 5 is connected to the input judging circuit and connects the processing circuit 2 to the telephone-facsimile selecting switch 7 in response to the input connection signal. The telephone-facsimile selecting switch 7 is connected to the telephone set 6 and to the facsimile set 15 and connects the processing circuit 2 to the telephone set 6 when the input connection signal indicates supply of the input single signal to the telephone set 6.

When telephone transmission to the telephone set 6 comes to an end, the processing circuit 2 receives an input end control signal through the order wires. The input detecting circuit 3 detects the input end control signal in the input single signal. The input judging circuit receives the input end control signal and produces an input disconnection signal. The line connecting switch 5 receives the input disconnection signal and disconnects the processing circuit 2 from the telephone-facsimile selecting switch 7.

When the input control signal indicates supply of the input single signal to the facsimile set 15 in the local station, the input judging circuit supplies the input control signal to the connection unit 20. The connection unit 20 further comprises a two-line selecting switch 9 for connecting the input judging circuit to a facsimile call generating circuit 10 in response to the input connection signal as a calling facsimile signal when the input connection signal indicates supply of the input single signal to the facsimile set 15.

The facsimile call generating circuit 10 receives the calling facsimile signal and generates a calling signal to deliver the calling signal to a facsimile interface 12 through the selecting switch 9. The facsimile interface 12 delivers the calling signal to the facsimile set 15. The facsimile set 15 receives the calling signal and establishes a direct current loop like in a public line interchanger used in a calling situation.

In the connection unit 20, a direct current loop detecting circuit 11 is connected to the facsimile set 15 through the facsimile interface 12 and detects the direct current loop in the facsimile set 15 to produce a loop signal. Connected to the direct current loop detecting circuit 11 and responsive to the loop signal, the input judging circuit produces a two line selection signal indicative of supply of the input single signal to the facsimile set 15 and delivers the two line selection signal to the two-line selecting switch 9.

The connection unit 20 further comprises a four-line to and from two-line exchanging circuit 8 connected to the telephone-facsimile selecting switch 7 and to the two-line selecting switch 9 for exchanging the input single signal into two-line type signal suitable for the facsimile set 15. The selecting switch 9 connects the exchanging circuit 8 to the facsimile interface 12 in response to the two line selection signal.

The line connection switch 5 receives the input connection signal and connects the processing circuit 2 to the telephone-facsimile selecting switch 7. The telephone-facsimile selecting switch 7 connects the processing circuit 2 to the four-line to and from two-line exchanging circuit 8 to deliver the input single signal to the exchanging circuit 8 in response to the input control signal.

In the manner described above, the facsimile set 15 receives the input signals transmitted through the order wires through the processing circuit 2, the line connecting switch 5, the telephone-facsimile selecting switch 7, the four-line to and from two-line exchanging circuit 8, the facsimile call two-line selecting switch 9, and the facsimile interface 12.

When facsimile transmission to the facsimile set 15 comes to an end, the input detecting circuit 3 detects the input end control signal in the input single signal which the processing circuit 2 receives through the order wires.

Responsive to the input end control signal, the input judging circuit produces the input disconnection signal. The line connecting switch 5 receives the input disconnection signal and disconnects the processing circuit 2 from the telephone-facsimile selecting switch 7.

The description will now proceed to a case where the apparatus transmits the four-line output signals by one of the telephone set 6 and the facsimile set 15.

The operation unit 13 serves as an output producing circuit when the telephone set 6 or the facsimile set 15 is put in operation by the attendant in the local station. The output producing circuit produces an indicating signal indicative of supply of the output single signal to the counterpart station and indicative of production of the output single signal by an indicated one of the telephone set 6 and the facsimile set 15.

The judging unit 14 is connected to the output producing circuit and serves as an output judging circuit. The output judging circuit judges whether the indicating signal indicates production of the output single signal by the telephone set 6 or the facsimile set 15. The output judging circuit produces an output connection signal indicative of the telephone set 6 or the facsimile set 15 after having judged that the indicating signal indicates production of the output single signal by the telephone set 6 or the facsimile set 15, respectively.

The line connecting switch 5 is connected to the output judging circuit and connects the processing circuit 2 to the telephone-facsimile selecting switch 7 in response to the output connection signal. The telephone-facsimile selecting switch 7 connects the processing circuit 2 to the telephone set 6 when the output connection signal indicates production of the output single signal by the telephone set 6 in the local station.

The supplying circuit 4 is connected to the output judging circuit and supplies the output single signal with the output control signal.

The processing circuit 2 receives the output single signal having the output control signal and processes the output single signal into the four-line output signals to transmit the four-line output signals through the order wires to the counterpart station.

When telephone transmission by the telephone set 6 comes to an end, the output producing circuit produces the output end control signal.

The output judging circuit receives the output end control signal and produces the output disconnection signal. The supplying circuit 4 receives the output disconnection signal and produces an end signal to deliver the end signal to the processing circuit 2. The processing circuit 2 processes the end signal as the output single signal into the four-line output signals to deliver the output signals to the counterpart station through the order wires.

When the indicating signal indicates production of the output single signal by the facsimile set 15 in the local station, the output judging circuit produces the output connection signal indicative of production of the output single signal by the facsimile set 15 in the local station.

In the connection unit 20, the direct current loop detecting circuit 11 detects a direct current loop in the facsimile set 15 through the facsimile interface 12 to produce the loop signal.

Connected to the direct current loop detecting circuit 11 and responsive to the loop signal, the output judging circuit produces a two line selection signal indicative of production of the output single signal and delivers the two line selection signal to the two-line selecting switch 9.

The selecting switch 9 connects the four-line to and from two-line exchanging circuit 8 to the facsimile set 15 through the facsimile interface 12 in response to the two line selection signal. The exchanging circuit 8 exchanges the output single signal from the facsimile set 15 into four-line type signal.

The line connection switch 5 receives the output connection signal and connects the processing circuit 2 to the telephone-facsimile selecting switch 7. The telephone-facsimile selecting switch 7 connects the processing circuit 2 to the exchanging circuit 8 to deliver the four-line type signal as the output single signal to the processing circuit 2 in response to the output connection signal.

In the manner described above, the output judging circuit produces the output connection signal in response to the indicating signal produced by the output producing circuit. The output judging circuit may produce the output connection signal in response to the loop signal directly.

What is claimed is:

1. An apparatus for selectively connecting a telephone set and a facsimile set to an order wire circuit, said order wire circuit including four order wires, said facsimile set communicating through two of said four order wires, said apparatus comprising:
   (a) selection means for selecting one of a telephone set and a facsimile set to be connected to an order wire circuit; and
   (b) connection means between said selection means and both of said telephone set and said facsimile set, said connection means being responsive to said selection means for connecting said selected one of said telephone set and said facsimile set to said order wire circuit;
   said connection means comprising:
      (i) first means connected to said selection means and said facsimile set, said first means being controlled by said selection means for selectively connecting said facsimile set to said order wire circuit when said facsimile set is selected by said selection means;
      (ii) exchanging means connected to said facsimile set by said first means in response to selection of said facsimile set, said exchanging means interconnecting a two wire circuit and a four wire circuit, said two wire and said four wire circuits being connected to said facsimile set and said order wire circuit, respectively; and
      (iii) second means connected between said telephone set and said exchanging means, said second means being controlled by said selection means for selectively connecting either said telephone set or said exchanging means to said order wire circuit.

2. An apparatus as claimed in claim 1, wherein said connection means further comprises detecting means connected to said selection means and said facsimile set for detecting whether or not a direct current loop is formed in said facsimile set and producing a loop signal in response to formation of a direct current loop; and supplying said loop signal to said selection means, wherein said selection means selects said facsimile set in response to said loop signal.

3. An apparatus as claimed in claim 1, wherein said connection means further comprises:
   switch means connected between said second means and said selection means, said switch means connecting and disconnecting said selection means and said second means in response to signals from said selection means.

4. An apparatus as claimed in claim 1, wherein said selection means comprises:
   processing means between said order wire circuit and said connection means for connecting said order wire circuit to said connection means; and
   control means connected to said processing means and said connection means for controlling said processing means and said connection means to connect either one of said telephone set and said facsimile set to said order wire circuit.

* * * * *